July 29, 1941.  L. J-B. FORBES  2,250,628

SHAPING OF GLASS SHEETS

Filed Sept. 16, 1936  2 Sheets-Sheet 1

Inventor
LEWIS JEX-BLAKE FORBES

By

Attorneys

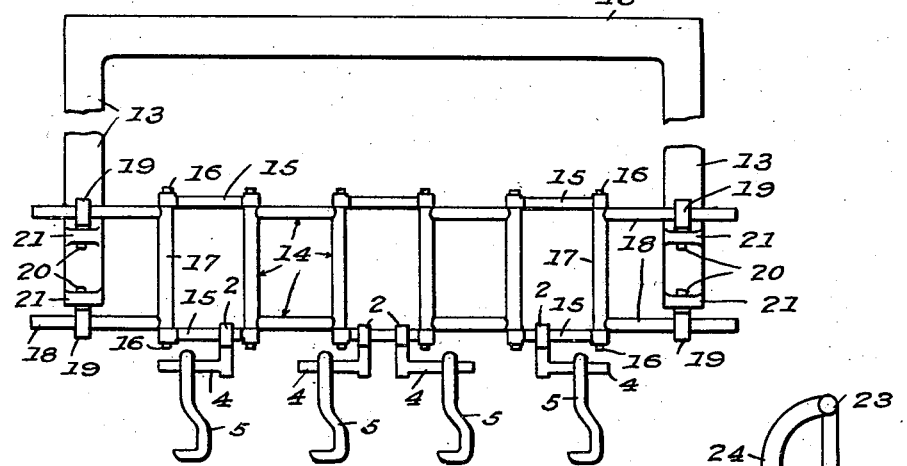
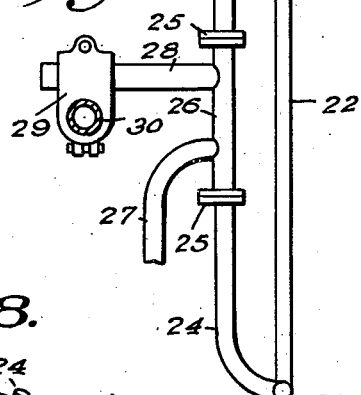
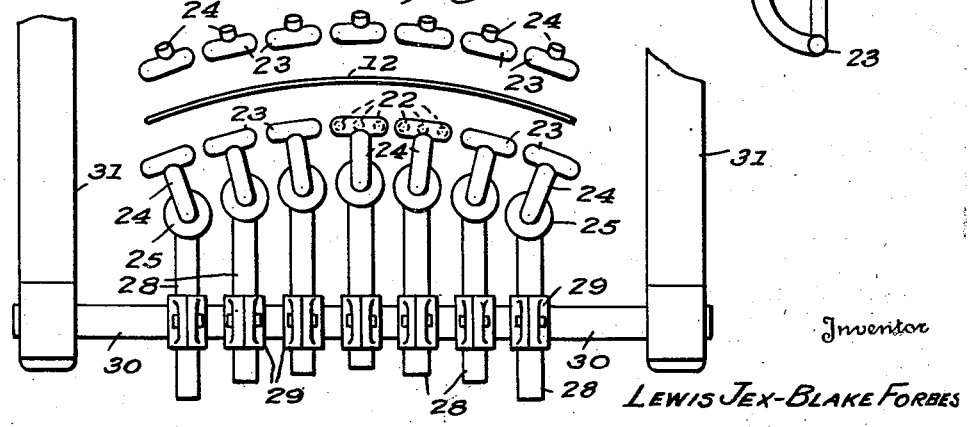

Patented July 29, 1941

2,250,628

UNITED STATES PATENT OFFICE 2,250,628

SHAPING OF GLASS SHEETS

Lewis Jex-Blake Forbes, St. Helens, England, assignor to Société Anonyme des Manufactures des Glaces et Produits Chimiques de Saint-Gobain, Chauny & Cirey, Paris, France, a corporation of France Application September 16, 1936, Serial No. 101,164
In Great Britain September 19, 1935

9 Claims. (Cl. 49—45)

This invention relates to the shaping of glass and has for its object an improved apparatus for making curved glass sheets.

In the production of curved glass sheets, flat sheets are heated in a furnace, then removed from the furnace and bent to the desired curve by formers and then cooled.

During all these operations the sheet is vertically suspended from a support at a plurality of points, and the means of suspension must be such that no lateral or twisting force is exerted on the glass sheet at the points of suspension, for the reason that any such force would tend to deform the sheet.

The present invention comprises means such that apart from the gripping action of the tongs, said tongs have only a vertical action on the sheet, and particularly means are provided so that whatever may be the displacement of the tongs in the horizontal direction during the bending operation, the point from which the tongs are hanging is constantly in the same vertical axis as the gripping points of the tongs on the sheet.

According to the invention, a suspension device for the tongs or the like permits a free pivotal movement of the tongs and free horizontal movements in two directions substantially at right angles. The tongs may be pivotally suspended from a runner adapted to move along a pivoted runway. The supporting member may be articulated so that it can be bent approximately to the curve of the glass sheet.

Moreover, another object of the invention is a perfected device for cooling the sheet after its shaping and particularly for tempering the shaped sheet. In fact, when sheets are cooled by a cooling medium issuing from a plurality of jets against the surface of the glass, the usual form of cooling apparatus in which the nozzles are in a plane is found to produce irregular cooling when applied to a curved sheet, by reason of the nozzles being at varying distances from the sheet and the jets striking the sheets at varying angles.

According to the invention, each blowing frame has a plurality of groups of vertical jet tubes, each group being so supported that it is adjustable in position by turning about a vertical axis and/or by moving horizontally in two directions at right angles. Each group may be pivotally supported on a bar adapted to slide to and away from the glass sheet in a member adapted to slide in a direction at right angles.

In the accompanying drawings:

Figure 7 is a front view of an articulated tong support;

Figure 8 is a plan view of a blowing frame;

Figure 9 is a side view of one member thereof, and

Figure 10 is a tongs suspension.

Figure 1:
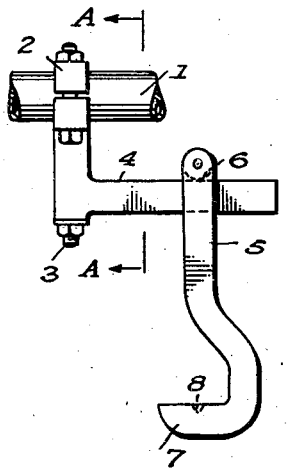
Figure 1 is a view of a suspension device for a tongs.
Figure 2:
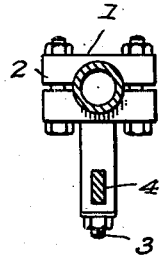
Figure 2 is a section thereof through the line A—A.
Figure 3:
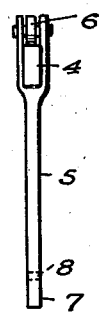
Figure 3 is a side view of a runner shown in Figure 1 and not seen in Figure 2.

Referring to Figures 1, 2, 3 and 10, 1 is a supporting member of tubular form and 2 is a block which can be clamped thereon in any position. The block 2 carries a pin 3 on which can turn freely the runway 4. A runner 5, with rollers 6, is adapted to run on the runway 4, and its lower horizontal end 7 has a depression 8 in which rests the pointed screw 9 in the piece 10 (Figure 10) which carries a tongs 11 of ordinary construction.

The tongs 11, therefore, can freely turn about the pointed screw 9, as a pivot; it can move in one direction by movement of the runner 5 along the runway 4 and it can move in a direction substantially at right angles by the turning of the runway 4 about the pin 3.

Figure 5:
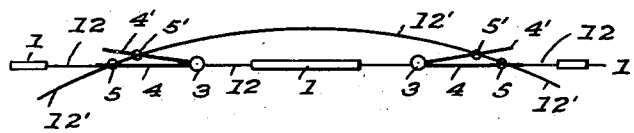

Figure 5 shows diagrammatically a flat sheet of glass 12 which, after heating, is to be bent to the form of 12¹. The sheet 12 is shown immediately under the supporting member 1, which is partly broken away. The circles 3 represent the pins on two blocks clamped on the member 1, carrying the runway 4, and runner 5, below which are the tongs. The tongs are attached to the flat glass 12, the glass, the runways 4 and the supporting member 1 being shown all in the same plane. After the glass has been heated in the usual way, it is pressed between formers to bend it to the form 12¹, the runways and runners, with tongs, then moving to the position shown at 4¹ and 5¹ respectively (the movement is somewhat exaggerated to make the drawing clear). It will be seen that the runways 4 have turned about their pins 3 and that the runners 5 have moved along the runways 4. The tongs also have pivoted about the screw 9 in order to maintain their angular position relatively to the glass.

It may be noted that, with two tongs as shown, it is not essential that there should be any turning of the runways 4 when the glass is bent, and that, if the glass when bent occupied a position a little lower in the drawing than that shown at 12¹, the movement of the runners 5, with the pivoting movement of the tongs, would be enough to bring the tongs into correct vertical position. In that case, however, the formers would have to be located so as to bring the glass, when bent, into a definite position, which is inconvenient to arrange. When the tongs are free to make the three movements as shown in Figure 5, the formers need not be accurately located so as to bring the glass, when bent, into a definite position.

Figure 4:
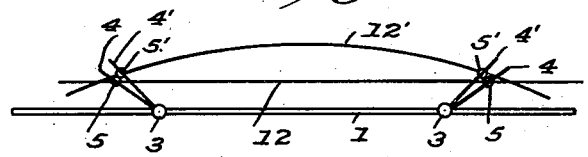
Figures 4, 5 and 6 are diagrammatic plan views of suspending devices for sheets of glass before and after bending.

Again, it may be seen from Figure 4, that the flat sheet 12, placed to one side of the supporting member 1, can be bent into the form 12¹, without the need for any movement of the runners 5 along the runways 4, but only if the glass, when bent, occupies the definite position shown.

Similarly, when only two tongs are used, one of the tongs may be fixed in position, though free to pivot, but only if the glass, when bent, occupies a definite position.

If the glass is to occupy an indefinite position when bent, both tongs must be capable of the three movements, that is to say, a pivoting movement and movements in two directions substantially at right angles.

Figure 6:
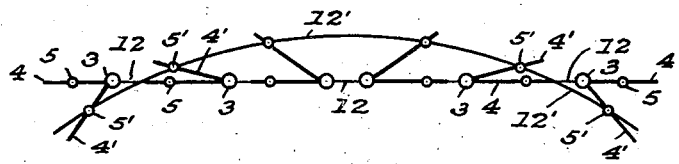

Figure 6 shows a glass bent from the position 12 to the position 12¹ when supported by six tongs, and in this case, if the glass is to occupy an indefinite position when bent, all the tongs must be capable of the three movements.

In case the sheet is cooled by means of air jets immediately after having been shaped and particularly when the sheet is much bent, it has been found advisable, to secure uniform cooling, to locate the apertures of the blowing frames so that the jets all strike the glass at the same angle, preferably at right angles, and so that the apertures are all equidistant from the glass. If the blowing frames are sets of vertical tubes each with a plurality of jet holes, the tubes are then located on curves parallel to the curve of the glass when bent. Now, in the usual construction of tempering apparatus, the glass sheet, after being heated in a furnace is raised into position between blowing frames above the furnace. This means that the suspension devices for the sheet must pass between the blowing frames. In the case of a sheet which is much bent, a straight member for supporting the tongs will not pass between blowing frames of which the tubes are located on curves parallel to the curve of the glass, unless the frames are located too far apart for efficient cooling.

The invention comprises an articulated supporting member for the tongs, which can be bent approximately to the curve which the glass is to be given and then, after the glass has been bent, the supporting member, with the bent sheet can be raised from the position which it occupies when the glass is being bent into position between the blowing frames.

Figure 7 shows an articulated supporting member held in a frame 13. It is composed of rectangular frames of tubular construction 14, united by cross members 15. Each cross member 15 is pivotally connected to the vertical members of the frames 14 by pins 16, so that the whole supporting member is articulated about each vertical member, and can therefore be bent to approximate to any curve. The end vertical members 17 have attached to them horizontal members 18 each of which passes through a block 19 pivoted at 20 to a bracket 21 on the frame 13.

The members 18 can, therefore take up any horizontal angular position required by the curve, and the extra length of the articulated member when bent is gained by the members 18 sliding in the blocks 19. The lower cross members 15 carry the blocks 2 of the suspension device shown in Figures 1 to 3.

In operation, the supporting member 14, 15 is bent approximately to the curve to be given to the glass; the flat glass sheet is then attached to the tongs and is let down into the furnace. After heating, it is raised from the furnace and bent between formers and thereby the runways 4 are all turned to positions approximately below the articulated support and therefore parallel to the curve of the glass. The articulated support and the bent glass sheet are then raised between the blowing frames.

Alternatively, the articulated support may be straight when the flat sheet is attached to the tongs, and during the heating, and it may be bent during the bending of the glass sheet by extension pieces attached to the formers engaging it and bending it.

Such device affords the advantage of enabling the operator to displace the fixation points of parts 4 and 5, on 2 during the shaping of the sheet and to maintain such points approximately in the vertical axis of the sheet. Consequently, it decreases the amplitude required for the movements of the parts 4 and 5 and even in some cases such parts become unnecessary; it is sufficient to hang the suspension parts 10 and 11 directly from the supporting bars 15. As the parts 14 and 15 when changing position constantly remain parallel to the sheet, it is even possible to suppress the pivot 9 without fearing that the tongs will exert a twisting action on the glass, though the shape of the sheet would change. In that case the parts connecting the sheet to the support 14 and 15 might be reduced to the tongs 11 only.

Referring to Figures 8 and 9, showing the blowing frame, each frame is shown divided up into seven members, each comprising a group of three vertical tubes 22. One of these members is shown in side elevation in Figure 9. The three tubes 22 are connected above and below to short headers 23, from each of which a pipe 24 passes to a flanged pivoting joint 25, connecting it pivotally to a length of pipe 26. Cooling medium is supplied to the pipe 26 through a pipe 27 with flexible connection. Each pipe 26 is fixed on a supporting bar 28 which passes slidably through a block 29, all the blocks 29 being carried on a tubular support 30, to which they can be clamped in any position. The support 30 is fixed in the frames 31.

By this construction, each group of three tubes can be so located that, approximately, the tubes of all the groups are equidistant from the bent glass sheet 12, and are uniformly spaced, and so that their jet holes (assumed to be on the front line of each tube) all direct the jets at right angles against the glass. The blowing frame on the other side of the glass is similarly constructed, its headers 23 being shown located so that the tubes are uniformly spaced and equidistant from the glass.

The invention is equally applicable to the suspension of devices for gripping the sheet equivalent to the tongs which are usually employed, such as screw clamps.

The construction of the blowing frame may be varied from that shown; thus, the headers of each group of tubes may be pivoted on a vertical axis to each of the adjoining headers, the whole set of headers thus forming an articulated frame similar to the articulated support shown in Figure 7. Each group of tubes is able to be turned about the vertical pivots and to be moved to and away from the glass sheet and also in a direction at right angles.

Having described my invention I declare that what I claim and desire to secure by Letters Patent is:

1. A method of bending a glass sheet which consists in suspending it in a vertical position by its upper edge from a metal support free to bend therewith and parallel to its upper edge, heating the sheet until the glass is at the softening point and applying pressure to the sheet and to the support to bend them to the same curvature.

2. A method of bending a glass sheet to a desired curvature which consists in suspending it in a vertical position by its upper edge from a metal support having a curvature approximating the desired final curvature of the sheet and free to bend with the sheet, heating the sheet until the glass is at the softening point and applying pressure to the sheet and to the support to bend them to the same desired final curvature.

3. A method of bending a glass sheet which consists in suspending it in a vertical position at a plurality of points by its upper edge from a metal support parallel to its upper edge and free to bend therewith, heating the sheet until the glass is at the softening point and applying pressure to the sheet and to the support to bend them to the same final curvature.

4. In an apparatus for supporting a flat heated glass sheet during bending, the combination of a runway pivoted to move around a vertical pivot, a runner movable on said runway, and a gripping device for supporting the sheet pivotally carried by the runner.

5. In an apparatus for supporting vertically a heated glass sheet, the combination with a frame formed of elements articulated together by vertical pivots, of a plurality of members depending therefrom, and gripping devices for the sheet carried by the said members.

6. In an apparatus for supporting vertically a heated glass sheet, the combination with a frame formed of elements articulated together by vertical pivots, a plurality of runways pivoted on the said elements by vertical pivots, a runner carried by each runway, and a gripping device for the sheet carried by each runner.

7. In an apparatus for tempering curved glass sheets, the combination of a suspension device formed of elements articulated together by vertical pivots, and a blowing frame for cooling said sheet positioned adjacent to said suspension device and formed of a plurality of groups of vertical jet tubes, each group being adjustable about a substantially vertical axis and movable substantially horizontally in two substantially perpendicular directions.

8. An apparatus according to claim 7 in which said blowing frame comprises a bar slidable to and away from the glass sheet, a member carrying said bar and slidable in a direction at right angles to the direction in which said bar can slide, and means for pivotally attaching a group of jet tubes to said bar.

9. A method of bending a glass sheet which consists in suspending it in a vertical position by its upper edge from a metal support free to bend therewith and parallel to its upper edge, heating the sheet until the glass is at the softening point and applying pressure to the sheet to bend it and the support to the same curvature.

LEWIS JEX-BLAKE FORBES.